J. P. SMITH.
Corn Sheller.
No. 91,572. Patented June 22, 1869.
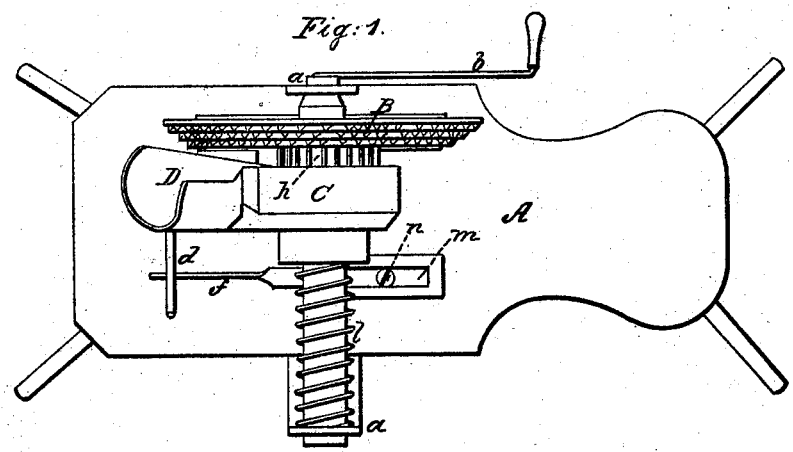
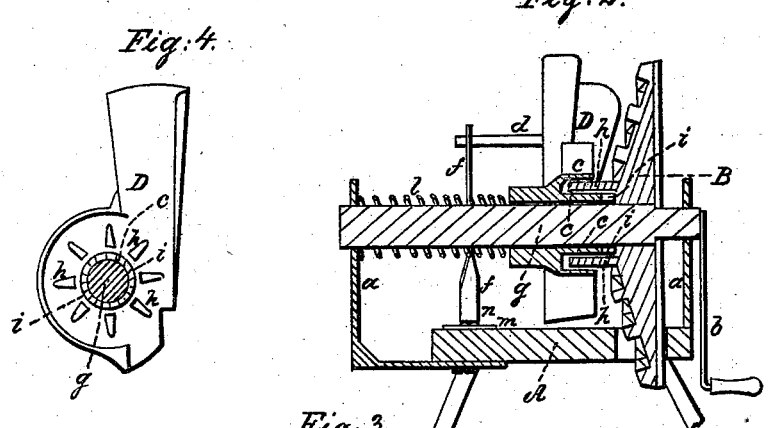
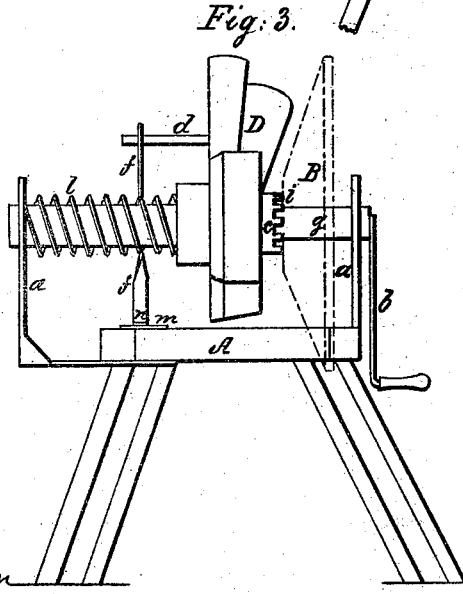

United States Patent Office.

J. P. SMITH, OF HUMMELSTOWN, PENNSYLVANIA.

Letters Patent No. 91,572, dated June 22, 1869.

IMPROVEMENT IN CORN-SHELLERS.

The Schedule referred to in these Letters Patent and making part of the same.

*To all whom it may concern:*

Be it known that I, J. P. SMITH, of Hummelstown, in the county of Dauphin, and State of Pennsylvania, have invented an Improved Corn-Sheller; and I do hereby declare that the following is a full and exact description thereof, reference being had to the accompanying drawings, making part of this specification—

Figure 1 being a plan of the sheller.

Figure 2, a vertical section thereof, in a plane indicated by the line $x\ x$, fig. 1.

Figure 3, a front view of the machine, the shelling-wheel being removed.

Figure 4, a view of a part detached.

Like letters designate corresponding parts in all of the figures.

This shelling-machine is constructed upon the principle of a revolving shelling-disk, B, having teeth upon its face, and a tubular, or partial tubular, concave, D, to feed and hold the ears of corn to the disk.

The whole is mounted on a suitable bench or stand, A.

This shelling-disk, in addition to the ordinary teeth upon its face, has a circular series of long teeth, $h\ h$, near, and concentrically around, and parallel with, the shaft $g$ of the shelling-disk, as shown.

This feature, of the long teeth drawing down the ears through a tubular concave, D, is found in a previous patent granted to me; but in the former case, the concave D did not extend down past the long teeth $h\ h$, as it does in this case, so as to hold the ears to the teeth, and render the act of feeding down and shelling them more sure and effectual.

I employ a drum, C, in connection with, and cast in one piece, with the concave D, for the purpose of surrounding the long teeth $h\ h$ of the shelling-wheel, and keeping the grains of corn from flying off, and to cover and shield the said teeth.

It slides toward and from the shelling-wheel, together with the concave upon the shaft $g$ of the said wheel, towards which it is pressed by a coiled spring, $l$.

There is on the back of the concave D a horizontal projecting-bar, $d$, which slides in a guide-standard, $f$, attached to the bench or stand A, the use of this bar being to hold the concave in position, and prevent its turning round with the wheel.

The flanch of the standard $f$, by which it is secured to the bench, has a long slot, $m$, as seen in fig. 1, to receive an attaching and adjusting-screen, $n$, so as to adjust the position of the standard, and consequently the angle of the concave D, to suit the condition of the corn, whether more or less dry.

Inside of the concentric long teeth $h\ h$ of the shelling-wheel, I form a tube, $c$, projecting from the inside of the drum C, around the shaft of the shelling-wheel, toward the face thereof.

It is of such a length, that when the drum C and concave D are pressed inward toward the shelling-wheel, as far as it is proper for them to go, the said tube will strike the face of the wheel, and stop the further movement of the concave in that direction.

In the end of this tube I make notches, $i\ i$, alternating with teeth, or projections, of about the same width as indicated; said notches being large enough to admit grains of corn.

Their object is to receive and hold grains of corn which get between the tube $c$ and the face of the shelling-wheel, and thereby prevent the lodging of the grains between the tube and wheel, which would prevent the concave from pressing in against the ear as far as might be necessary.

As the grains get into the notches, they lie loose there, and do not clog the machine.

What I claim as my invention, and desire to secure by Letters Patent, is—

The combination of the drum C, tube $c$, and concave D, arranged and operating in connection with the long teeth $h\ h$, of the shelling-wheel, substantially as and for the purpose herein specified.

Also the notches $i$, in the end of the tube $c$, for the purpose set forth.

Also, the combination of the projecting bar $d$, on the concave D, and the adjustable guide-standard $f$, substantially as and for the purpose herein set forth.

The above specification of my improved corn-sheller, signed by me, this      day of January, 1869.

J. P. SMITH.

Witnesses:
JOHN MORSE,
CORNELIUS SMITH.